United States Patent
Rodriguez et al.

(10) Patent No.: US 9,135,573 B1
(45) Date of Patent: Sep. 15, 2015

(54) ESTIMATING REPUTATION SCORES IN REPUTATION SYSTEMS

(71) Applicant: LinkedIn Corporation, Mountain View, CA (US)

(72) Inventors: Mario S. Rodriguez, Santa Clara, CA (US); Viet Thuc Ha, Santa Clara, CA (US); Jessica V. Zuniga, Palo Alto, CA (US); Mathieu Bastian, San Francisco, CA (US); Michael Conover, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 26 days.

(21) Appl. No.: 14/216,797

(22) Filed: Mar. 17, 2014

(51) Int. Cl.
*G06N 99/00* (2010.01)

(52) U.S. Cl.
CPC .................................... *G06N 99/005* (2013.01)

(58) Field of Classification Search
None
See application file for complete search history.

(56) References Cited

U.S. PATENT DOCUMENTS

| | | | | |
|---|---|---|---|---|
| 2010/0161526 A1* | 6/2010 | Zhang et al. | ................... | 706/12 |
| 2012/0197906 A1* | 8/2012 | Landau et al. | ................ | 707/748 |
| 2012/0284282 A9* | 11/2012 | Ghosh et al. | .................. | 707/748 |
| 2013/0066884 A1* | 3/2013 | Kast et al. | ..................... | 707/748 |
| 2014/0129631 A1* | 5/2014 | Jayaram et al. | ............... | 709/204 |

OTHER PUBLICATIONS

Chen, Bee-Chung, et al. "User reputation in a comment rating environment." Proceedings of the 17th ACM SIGKDD international conference on Knowledge discovery and data mining. ACM, 2011. [Online] Downloaded <Jun. 12, 2014> <http://users.cis.fiu.edu/~lzhen001/activities/KDD2011Program/docs/p159.pdf>.*

Wu, Pei, Weiping Liu, and Cihang Jin. "A novel recommender system fusing the opinions from experts and ordinary people." Proceedings of the Workshop on Context-Aware Movie Recommendation. ACM, 2010. [Online] Downloaded <Jun. 12, 2014> <http://dl.acm.org/citation.cfm?id=1869659>.*

* cited by examiner

*Primary Examiner* — Kakali Chaki
*Assistant Examiner* — Kevin W Figueroa
(74) *Attorney, Agent, or Firm* — Park, Vaughan, Fleming & Dowler LLP; Chia-Hsin Suen

(57) ABSTRACT

The disclosed embodiments provide a reputation system. The reputation system includes a statistical model associated with a set of items and a set of dimensions of the items in the reputation system, wherein the statistical model is trained using a positive class and a negative class. The reputation system also includes a scoring apparatus that applies the statistical model to a set of features for each of the items to estimate a set of reputation scores for the items. Finally, the reputation system includes a ranking apparatus that enables use of the set of reputation scores in the reputation system.

20 Claims, 8 Drawing Sheets ously stored on a computer-readable storage medium, which may be any device or medium that can store code and/or data for use by a computer system. The
ESTIMATING REPUTATION SCORES IN REPUTATION SYSTEMS

RELATED APPLICATIONS

The subject matter of this application is related to the subject matter in a co-pending non-provisional application by the same inventors as the instant application and filed on the same day as the instant application entitled "Generating Rankings of Reputation Scores in Reputation Systems," having U.S. patent application Ser. No. 14/216,821, and filing date 17 Mar. 2014.

The subject matter of this application is also related to the subject matter in a co-pending non-provisional application by the same inventors as the instant application and filed on the same day as the instant application, entitled "Querying of Reputation Scores in Reputation Systems," having U.S. patent application Ser. No. 14/216,847, and filing date 17 Mar. 2014.

BACKGROUND

1. Field

The disclosed embodiments relate to reputation systems. More specifically, the disclosed embodiments relate to techniques for estimating reputation scores in reputation systems.

2. Related Art

Online reputation systems may be used to establish ratings or reputation scores for a variety of items, including search results, users, organizations, products, and/or services. The ratings or reputation scores may facilitate decision-making related to the items, particularly in light of the growing amount and availability of information in the digital age. For example, hotel ratings may allow a consumer to filter the set of hotels to be considered during an online hotel booking. Similarly, scores or rankings of users by the users' levels of expertise in professional skills may be used by recruiters to identify ideal candidates for job opportunities and/or open positions during use of an online professional network.

To generate reputation scores or ratings, reputation systems may rely on feedback or data related to the items being scored. For example, a reputation system may collect ratings, preferences, activities, sensor readings, and/or other data from multiple sources such as users, sensors, financial institutions, and/or organizations. The reputation system may also apply a machine-learning technique to the collected data to identify patterns in the data, which are used to predict and/or infer unknown attributes associated with the items, such as a user's rating of a product or service he/she has not yet tried. Finally, the reputation system may use the predicted and/or inferred attributes to make recommendations and/or rank the items, thereby filtering the amount of information and/or choices associated with the items so that decisions related to the items may be more easily made.

Consequently, decision-making and information processing related to large sets of items may be facilitated by mechanisms for increasing the accuracy, coverage, and/or flexibility of reputation systems for scoring or ranking the items.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
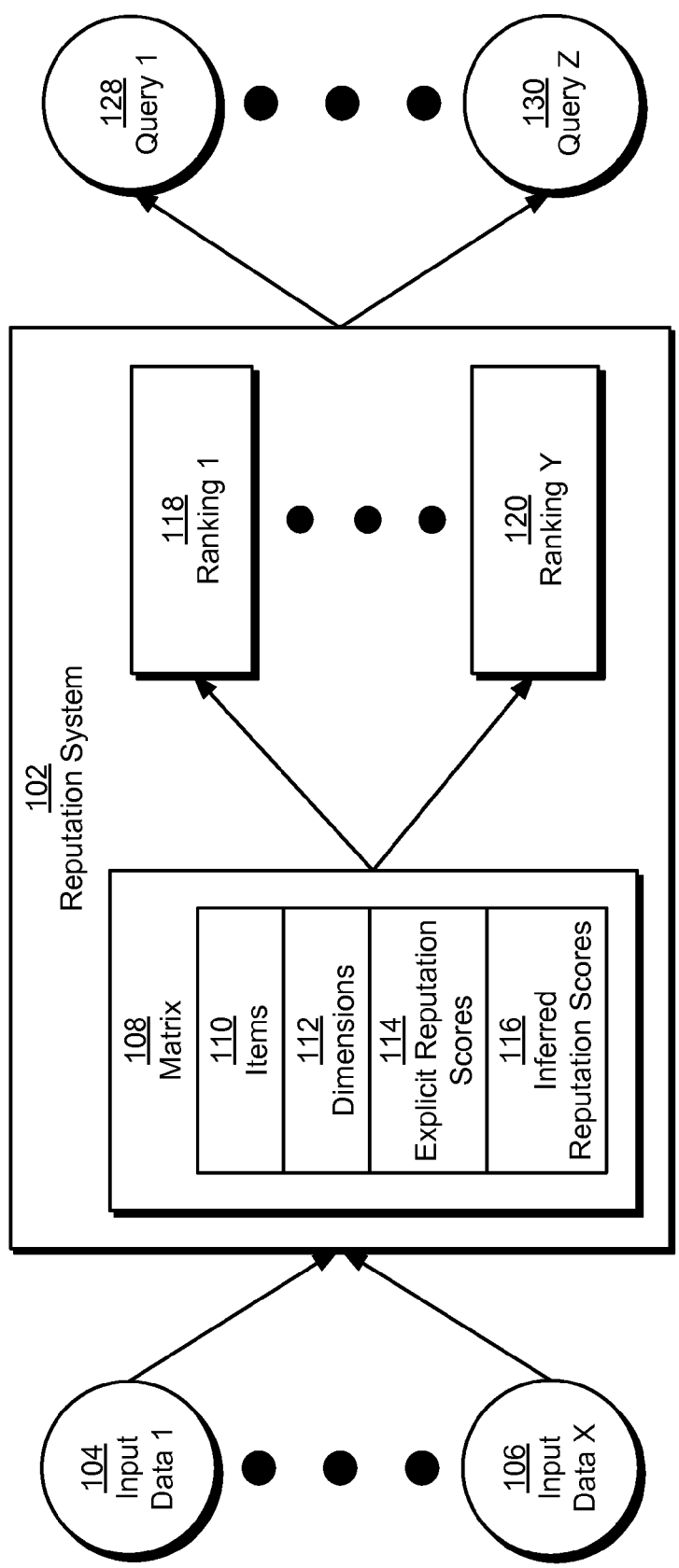
FIG. 1 shows a schematic of a system in accordance with the disclosed embodiments.

The disclosed embodiments provide a method and system for facilitating use of a reputation system. As shown in FIG. 1, a reputation system 102 may be used to generate rankings (e.g., ranking 1 118, ranking y 120) of a set of items 110 based on one or more dimensions 112 of items 110. For example, items 110 may be users, web pages, movies, flights, apartments, restaurants, goods, services, and/or other entities.

Dimensions 112 may include skills, attributes, and/or preferences of the users; quality, important, or relevance of the web pages; and/or characteristics of the movies, flights, apartments, restaurants, goods, and/or services that may be pertinent to the users.

In particular, the rankings may be based on reputation scores (e.g., explicit reputation scores 114, inferred reputation scores 116) related to items 110 and dimensions 112. A reputation score may be calculated for each item based on the extent to which the item possesses or reflects a certain dimension (e.g., attribute, characteristic, etc.). Items 110 may then be ranked by increasing or decreasing reputation scores for that dimension and/or other dimensions. For example, webpages, movies, restaurants, hotels, flights, and/or other goods or services may be ranked according to quality, relevance, value, and/or importance with respect to a set of users.

Reputation system 102 may then provide the rankings for use with queries (e.g., query 1 128, query z 130) associated with items 110 and/or dimensions 112. For example, reputation system 102 may enable use of the rankings in sorting and/or filtering items 110 in responses to the queries. Rankings from reputation system 102 may also be used to generate recommendations of items 110 based on the order of items 110 in the rankings and/or criteria (e.g., dimensions 112) associated with the recommendations.

In one or more embodiments, items 110 are users in an online professional network, and dimensions 112 are skills of the users. The skills may be professional skills that are relevant to the users' occupations, industries, and/or work experience. For example, a software engineer may be associated with skills such as individual programming languages; programming-related disciplines (e.g., web, kernel, graphics, embedded systems, distributed systems, networking, etc.); and/or broad skill sets such as "computer programming," "software development," or "software testing."

The online professional network may allow the users to establish and maintain professional connections, list work and community experience, endorse and/or recommend one another, and/or search and apply for jobs. Employers and/or recruiters may list jobs, search for potential candidates, and/or provide business-related updates to the users. As a result, reputation scores for the users may be calculated according to the users' levels of expertise in one or more skills, as determined by demographic data for the users, the users' interaction with other users, and the users' activity within the online professional network. In turn, rankings of the users by reputation score may be provided in responses to queries from potential employers and/or recruiters for users with one or more skills. Thus, reputation system 102 may facilitate the identification of users with the right skills and/or skill levels for individual positions, job openings, or opportunities.

To enable use of the rankings with the queries, reputation system 102 may first calculate a set of explicit reputation scores 114 for a subset of items 110 and dimensions 112 based on input data (e.g., input data 1 104, input data x 106) associated with items 110 and/or dimensions 112. For example, reputation system 102 may apply a statistical model to features in the input data to estimate reputation scores representing users' levels of expertise in explicitly declared skills of the users in an online professional network. As mentioned above, the features may include demographic data for the users, data associated with the users' interaction with other users, and/or data associated with the users' activity within the online professional network. Reputation system 102 may populate a matrix 108 of items 110 and dimensions 112 with explicit reputation scores 114 and unknown values for item-dimension pairs that do not have explicit reputation scores 114.

Next, reputation system 102 may use a collaborative-filtering technique to update matrix 108 with a set of inferred reputation scores 116 that replace some or all of the unknown values. The collaborative-filtering technique may be used to calculate a factorization of matrix 108, and two or more matrices produced from the factorization may be multiplied to fill in the unknown values with inferred reputation scores 116.

Finally, reputation system 102 may generate rankings of items 110 by one or more dimensions 112 based on the reputation scores in matrix 108 and provide the rankings in response to queries to reputation system 102. The rankings may be based on quantiles associated with dimensions 112 from the queries. For example, reputation system 102 may rank items 110 based on the closeness of the reputation scores of items 110 for a given dimension to a quantile (e.g., percentile) associated with the dimension from a query. Moreover, items 110 may be ranked and provided in response to queries based on the relative weighting or importance of dimensions specified in the queries. For example, a query may specify that a first dimension is three times as important as a second dimension. As a result, reputation scores from the first dimension may be weighted three times more than dimension scores from the second dimension during calculation of a ranking for the query. Use of reputation system 102 in generating reputation scores and/or rankings is discussed in further detail below with respect to FIGS. 2, 3A, and 3B.

Figure 2:
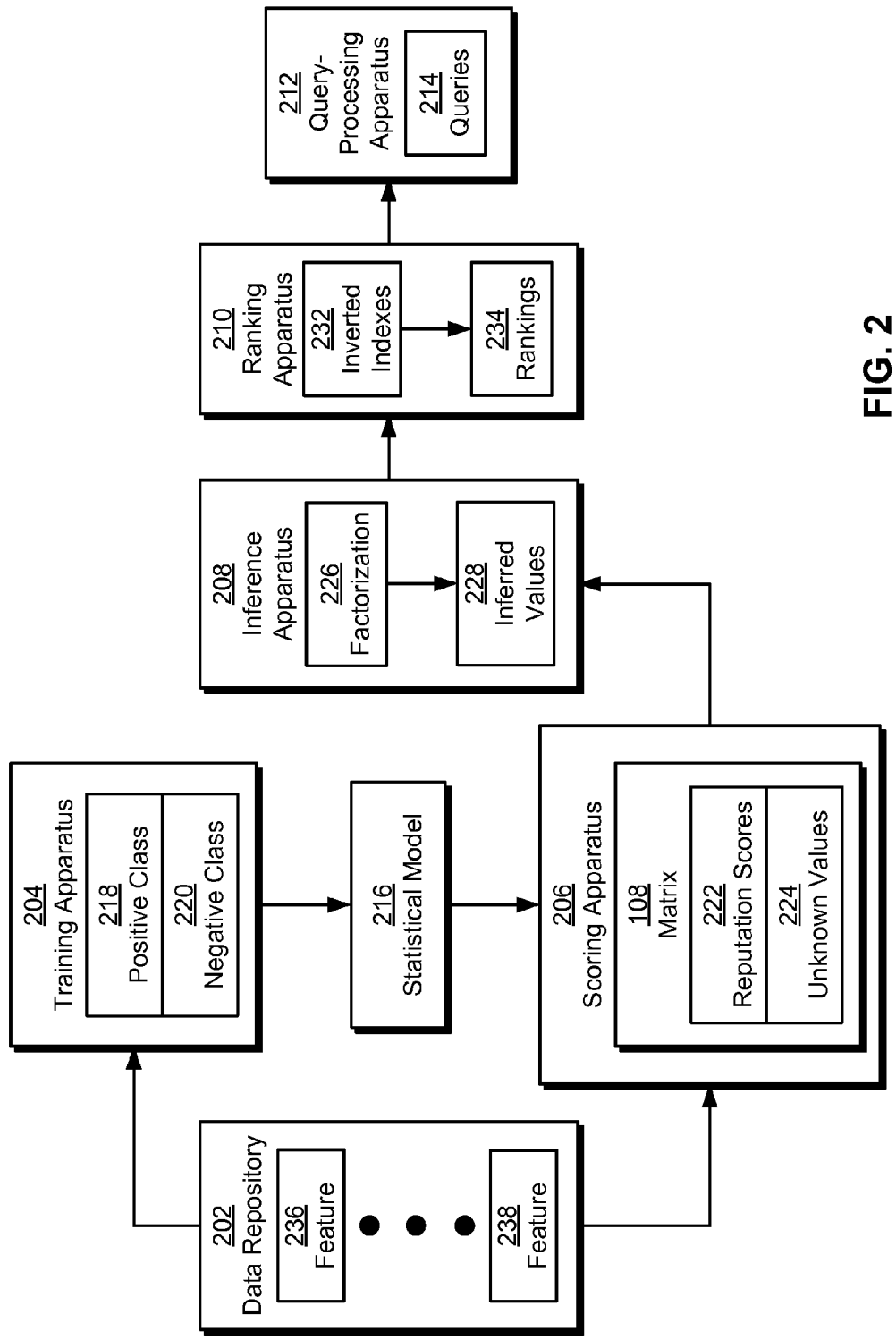
FIG. 2 shows a reputation system in accordance with the disclosed embodiments.

FIG. 2 shows a reputation system (e.g., reputation system 102 of FIG. 1) in accordance with the disclosed embodiments. As mentioned above, the reputation system may be used to generate reputation scores 222 for items based on dimensions of the items. In turn, reputation scores 222 may be used to obtain rankings 234 of the items by one or more of the dimensions, and one or more rankings 234 may be provided in response to a query 214 to the reputation system.

As shown in FIG. 2, a scoring apparatus 206 in the reputation system may calculate a set of reputation scores 222 using a statistical model 216 and a set of features 236-238 for items in the reputation system. Features 236-238 may be aggregated into a data repository 202 from records of user feedback (e.g., ratings, scores, likes/dislikes, reviews, profile edits, etc.) and/or user actions (e.g., page views, clicks, purchases, etc.) with one or more websites and/or network-enabled applications. For example, features 236-238 may be received from a number of servers and/or data centers associated with the websites and/or applications and stored in a relational database for subsequent retrieval and use.

Prior to calculating reputation scores 222, a training apparatus 204 may obtain training data for statistical model 216, which includes a positive class 218 and a negative class 220. Positive class 218 may include data associated with items of a particular category (e.g., trait, attribute, dimension, etc.), while negative class 220 may include data associated with items that do not belong in the category.

For example, statistical model 216 may be a logistic regression model that classifies each user (e.g., representing an item in the reputation system) as either an expert or a non-expert in a corresponding skill (e.g., representing a dimension in the reputation system). Positive class 218 may thus include a subset of features 236-238 associated with users with known expertise in one or more skills. Such "expert" users may be identified based on publications, speeches, awards, and/or contributions of the users in their respective fields. On the other hand, negative class 220 may include a subset of features 236-238 associated with users who are not recognized as experts in their respective fields, such as random users who list a given skill in their profiles. Because far fewer users belong in positive class 218 than negative class 220, positive class 218 may be oversampled to produce a roughly class-balanced set of training data for statistical model 216.

Next, training apparatus 204 may use positive class 218 and negative class 220 to train statistical model 216. For example, training apparatus 204 may use maximum-likelihood estimation (MLE) and/or another estimation technique to estimate the parameters of a logistic regression model for calculating reputation scores 222. After training of the logistic regression model is complete, the parameters may be set so that the logistic regression model outputs values close to 1 for training data in positive class 218 and values close to 0 for training data in negative class 220.

The trained statistical model 216 may be provided to scoring apparatus 206, which calculates reputation scores 222 for items not included in the training data by applying statistical model 216 to features (e.g., features 236-238) for each of the items. For example, a feature vector may be generated for each item in the reputation system from a subset of features 236-238 in data repository 202, and statistical model 216 may be applied to the feature vector to calculate a reputation score for the item with respect to a dimension of the item. In other words, statistical model 216 may be used to classify the item as a member or non-member of one or more dimensions in the reputation system.

As described above, items in the reputation system may correspond to users in an online professional network, and dimensions associated with the items may represent skills of the users. In turn, reputation scores 222 may represent the users' levels of expertise in the corresponding skills. For example, reputation scores 222 may be calculated for skills that are explicitly declared in the users' profiles with the online professional network. Features 236-238 used in the calculation of reputation scores 222 may include demographic features, social features, and behavioral features. Demographic features may include data related to a user's location, age, experience, education, and/or background; social features may include features related to the behavior of other users with respect to the user; and behavioral features may include features related to the user's actions or behavior with the online professional network and/or related websites or applications.

More specifically, the social features may include a number of invitations (e.g., connection requests and/or connections) sent and/or received by a user in the online professional network. Invitations among the users of the online professional network may then be used to create an invitation network, which may be used to calculate rankings representing the importance of the users within the invitation network. For example, the rankings may be calculated as PageRank (PageRank™ is a registered trademark of Google Inc.) scores that are normalized so that each PageRank score represents how much more connected a user is than a user with a "least possible importance." Such normalization may eliminate dependence on the size of the invitation network and enable comparison of rankings across invitation networks of different sizes.

The social features may further include endorsement features related to endorsements among the users. Each endorsement may be given by a first user to a second user as acknowledgment and/or support of a skill of the second user. The endorsement features for a user may thus include a number of endorsers, a number of endorsements received or given by the user, and/or the user's ranking in an endorsement network. As with the invitation scores described above, the endorsement network may be created from endorsements among the users. The rankings may then be calculated as PageRank scores and/or other network-based scores that are normalized to eliminate dependence on the size of the endorsement network and enable comparison of rankings across networks of different sizes. Because computationally intensive rankings such as PageRank scores are included as features in statistical model 216 along with other behavioral, social, and/or demographic features, changes to the features used by statistical model 216 may require significantly less iteration time than changes to a statistical model that includes the features as customizations to computationally intensive scores (e.g., PageRank scores).

The social features may additionally be filtered and/or constructed in the context of pairs of users with the same skill. For example, an endorsement of a user's skill may be counted in the endorsement features only if the endorsing user also lists the skill. Such filtering may facilitate the inclusion of meaningful endorsements in the social features and increase the accuracy of statistical model 216.

Behavioral features for a user may represent the user's level of activity in the online professional network. For example, the behavioral features may include a number of address book imports, received messages, sent messages, accepted messages, rejected messages, page views, clicks on job applications, visits to a jobs page, clicks on articles, page views of other users' profiles, page views of the user's own profile, page views of the user's profile by other users, and/or subscriptions.

Finally, features used in statistical model 216 may include derived features that are transformations of social, behavioral, and/or demographic features. Such transformations may include ratios of a user's incoming and outgoing endorsements, ratios of page views of the user's profile by other users and page views of other user profiles by the user, and/or the user's ranking in the endorsement and/or invitation networks described above. The features may also include additional features, such as visits to a user's profile from organic searches with search engines and/or confidence scores representing the inferred confidence of statistical model 216 in calculating reputation scores 222.

After reputation scores 222 are calculated, scoring apparatus 206 may include reputation scores 222 in matrix 108, along with unknown values 224 for reputation scores that have not been calculated by statistical model 216. For example, rows of matrix 108 may represent users in the online professional network, and columns of matrix 108 may represent the users' skills. Elements in matrix 108 may be filled with reputation scores 222 from statistical model 216 only if the elements represent skills that are explicitly listed in and/or otherwise obtained from profiles of the corresponding users and with unknown values 224 otherwise. In other words, reputation scores 222 may correspond to explicit reputation scores, such as explicit reputation scores 114 of FIG. 1.

After matrix 108 is populated with reputation scores 222 and unknown values 224, an inference apparatus 208 in the reputation system may calculate a factorization 226 of matrix 108 and use factorization 226 to update matrix 108 with a set of inferred values 228 for reputation scores 222 and/or unknown values 224. Prior to calculating factorization 226, inference apparatus 208 may apply a normal score transformation to matrix 108 so that reputation scores 222 in matrix 108 are normally distributed.

In one or more embodiments, inference apparatus 208 calculates factorization 226 using a collaborative filtering technique that produces two or more factor matrices with a product that approximates reputation scores 222 in matrix 108.

The collaborative filtering technique may calculate factors in factorization 226 by minimizing a weighted least squares loss function. In turn, linear combinations (e.g., dot products) of the factors may be used to generate inferred values 228 (e.g., inferred reputation scores 116 of FIG. 1) that replace unknown values 224 in matrix 108. For example, inferred values 228 may be calculated as dot products between item factors and dimension factors in the factor matrices. Inferred values 228 may then be filtered based on a set of confidence scores (e.g., inferred confidence) from statistical model 216 so that only inferred values associated with confidence scores above a pre-specified threshold (e.g., higher confidence) are included in matrix 108.

For example, factorization 226 of matrix 108 with users as items and skills as dimensions may allow inferred values 228 to be generated for skills that are not explicitly listed and/or obtained from the users' profiles. In addition, the reduced dimensionality space of factorization 226 may be associated with clusters of related skills, such as skills that may be shared by users in the same field or occupation. Factorization 226 may thus be used to infer skills possessed by users with established and/or identified knowledge or expertise in other (e.g., related) skills. Calculation and inference of reputation scores in reputation systems is described in further detail below with respect to FIG. 3A.

After matrix 108 is updated with inferred values 228, a ranking apparatus 210 in the reputation system may use the updated matrix 108 to generate rankings 234 of the items by one or more of the dimensions, and a query-processing apparatus 212 in the reputation system may provide rankings 234 in response to queries 214 of the reputation system. First, ranking apparatus 210 may create and/or obtain inverted indexes 232 of the items by the dimensions. If users are items and skills are dimensions, each inverted index may indicate if a user's reputation score for a particular skill is explicitly calculated (e.g., by scoring apparatus 206) or inferred (e.g., by inference apparatus 208).

Next, ranking apparatus 210 may generate rankings 234 based on inverted indexes 232 and queries 214 received by query-processing apparatus 212. Each query may include one or more dimensions used to compare and/or rank the items. For example, the query may include multiple skills required for a position or job opening. As a result, a ranking of users matching the query may be generated by summing the reputation scores of the users in the queried skills, then ordering the users by decreasing sum of reputation scores. The query may also specify different levels of importance for different dimensions. For example, a query for users matching a set of skills may indicate that a "data mining" skill is twice as important as an "information retrieval" skill. In turn, the ranking of users matching the query may be generated according to a weighted sum of the users' reputations scores in the queried skills. In the weighted sum, each user's reputation score for the "data mining" skill may be multiplied by a weight that is twice the weight by which the "information retrieval" skill is multiplied.

Each query may additionally specify one or more quantiles associated with the dimension(s). For example, a query to the reputation system may include "data mining^80, information retrieval^90," which indicates an attempt to match items (e.g., users) with reputation scores at or near the $80^{th}$ percentile for a "data mining" dimension (e.g., skill) and reputation scores at or near the $90^{th}$ percentile for an "information retrieval" dimension (e.g., skill).

If quantiles are not explicitly provided in a query, ranking apparatus 210 and/or query-processing apparatus 212 may identify and/or assign appropriate quantiles to the dimensions in the query. In particular, ranking apparatus 210 and/or query-processing apparatus 212 may associate a default quantile (e.g., $100^{th}$ percentile) with a dimension from a query if the query does not specify a quantile for the dimension. On the other hand, ranking apparatus 210 and/or query-processing apparatus 212 may identify a quantile associated with the dimension based on a querying pattern associated with the query. For example, ranking apparatus 210 and/or query-processing apparatus 212 may examine similar queries (e.g., from similar users and/or contexts) containing the dimension and assign a quantile to the dimension in the query based on the distribution and/or frequency of quantiles for the dimension from the similar queries.

Query-processing apparatus 212 may also accept Boolean queries, such as "(data mining OR information retrieval) AND Java." If no operator is provided between two dimensions in a query, query-processing apparatus 212 may apply a disjunctive operator (e.g., OR) or a conjunctive operator (e.g., AND) to the dimensions.

After a query is received by query-processing apparatus 212, ranking apparatus 210 may generate a ranking of items according to the closeness of reputation scores for each item to the specified quantile(s). For example, ranking apparatus 210 may process a query of "data mining^80, information retrieval^90" by calculating the rectilinear distance between the percentiles of the "data mining" and "information retrieval" reputation scores for each item (e.g., user) in the reputation system and the corresponding percentiles in the query. As a result, a first item with reputation scores in the $85^{th}$ percentile for both "data mining" and "information retrieval" may have a rectilinear distance of 10, and a second item with reputation scores in the $90^{th}$ percentile for "data mining" and the $98^{th}$ percentile for "information retrieval" may have a rectilinear distance of 18. Because the first item has a lower rectilinear distance than the second item, the first item may be ranked higher than the second item.

Conversely, if the query does not specify percentiles for the two dimensions, a default percentile of 100 may be assigned to both dimensions. In turn, the first and second items may have rectilinear distances of 15 and 12 from the percentiles of the query, respectively, resulting in higher placement of the second item in the ranking than the first item. Ranking of the first and second items according to the default percentile may also be accomplished without calculating or otherwise obtaining the percentiles corresponding to the items' reputation scores. Instead, the items may be ranked according to a linear combination (e.g., sum, weighted sum, etc.) of the items' reputation scores for the queried dimensions.

To expedite generation of the ranking, inverted indexes 232 may store quantiles of reputation scores associated with the items instead of the reputation scores. The ranking may thus be generated by using inverted indexes 232 to identify candidate items that match the query (e.g., items with nonzero reputation scores in one or more dimensions from the query), then using percentiles in inverted indexes 232 to rank the candidate items. For example, an inverted index may identify a set of items with explicit or inferred reputation scores in a dimension and include percentiles of the items' reputation scores in the dimension. A response to a query for the $100^{th}$ percentile in the dimension may be generated by ordering the items by descending percentile. On the other hand, a response to a query for the $50^{th}$ percentile of the dimension may be processed by calculating the closeness (e.g., rectilinear distance) of each item's percentile to the $50^{th}$ percentile, then ordering the items in the ranking so that the closest items are at the top of the ranking.

Those skilled in the art will appreciate that the system of FIG. 2 may be implemented in a variety of ways. First, data repository 202, training apparatus 204, scoring apparatus 206, inference apparatus 208, ranking apparatus 210, and query-processing apparatus 212 may be provided by a single physical machine, multiple computer systems, one or more virtual machines, a grid, one or more databases, one or more filesystems, and/or a cloud computing system. Training apparatus 204, scoring apparatus 206, inference apparatus 208, ranking apparatus 210, and query-processing apparatus 212 may additionally be implemented together and/or separately by one or more hardware and/or software components and/or layers.

Second, a number of statistical models and techniques may be used to calculate, infer, and/or filter reputation scores and rankings 234. For example, reputation scores may be calculated and/or inferred using support vector machines (SVMs), artificial neural networks (ANNs), naïve Bayes classifiers, and/or other type of statistical models, classification techniques, matrix factorization techniques, and/or collaborative filtering techniques. Similarly, rankings 234 may be generated in response to queries 214 based on cosine similarities, Euclidean distances, vector decompositions, and/or other measures of similarity or distance.

Finally, the reputation system may be used to generate reputation scores and rankings for various items and dimensions. For example, the reputation system may be used to establish the reputations of hotels, restaurants, and/or other establishments. Features and/or dimensions associated with the establishments may include price, popularity, user ratings, star ratings, critic ratings, noise, decor, quality, amenities, neighborhood, and/or location. Queries (e.g., queries 214) submitted by users to the reputation system may include different percentiles for different dimensions, depending on the users' sensitivity to and/or preferences for different dimensions. Thus, a price-sensitive user may specify a lower percentile for price and adjust the percentiles for other dimensions to find reasonably priced establishments that rank higher in the other dimensions.

In another example, the reputation system may be used to query for flights and/or other travel itineraries. In the queries, users may specify dimensions such as price, duration, distance, and/or number of stops. The users may adjust percentiles for the dimensions (e.g., using sliders, text boxes, dials, and/or other user-interface elements) to weight the dimensions according to the user's preferences for price, duration, distance, and/or number of stops. Rankings of travel itineraries may be provided to the users in response to the queries based on the closeness of the travel itineraries to the specified percentiles, rather than hard filters that require exact or close-to-exact matches between the travel itineraries and the percentiles. The users may thus be provided with search results for the queries, even if the search results do not closely match the queries and/or the parameters of the queries are too restrictive for perfect or close matches.

Figure 3A:
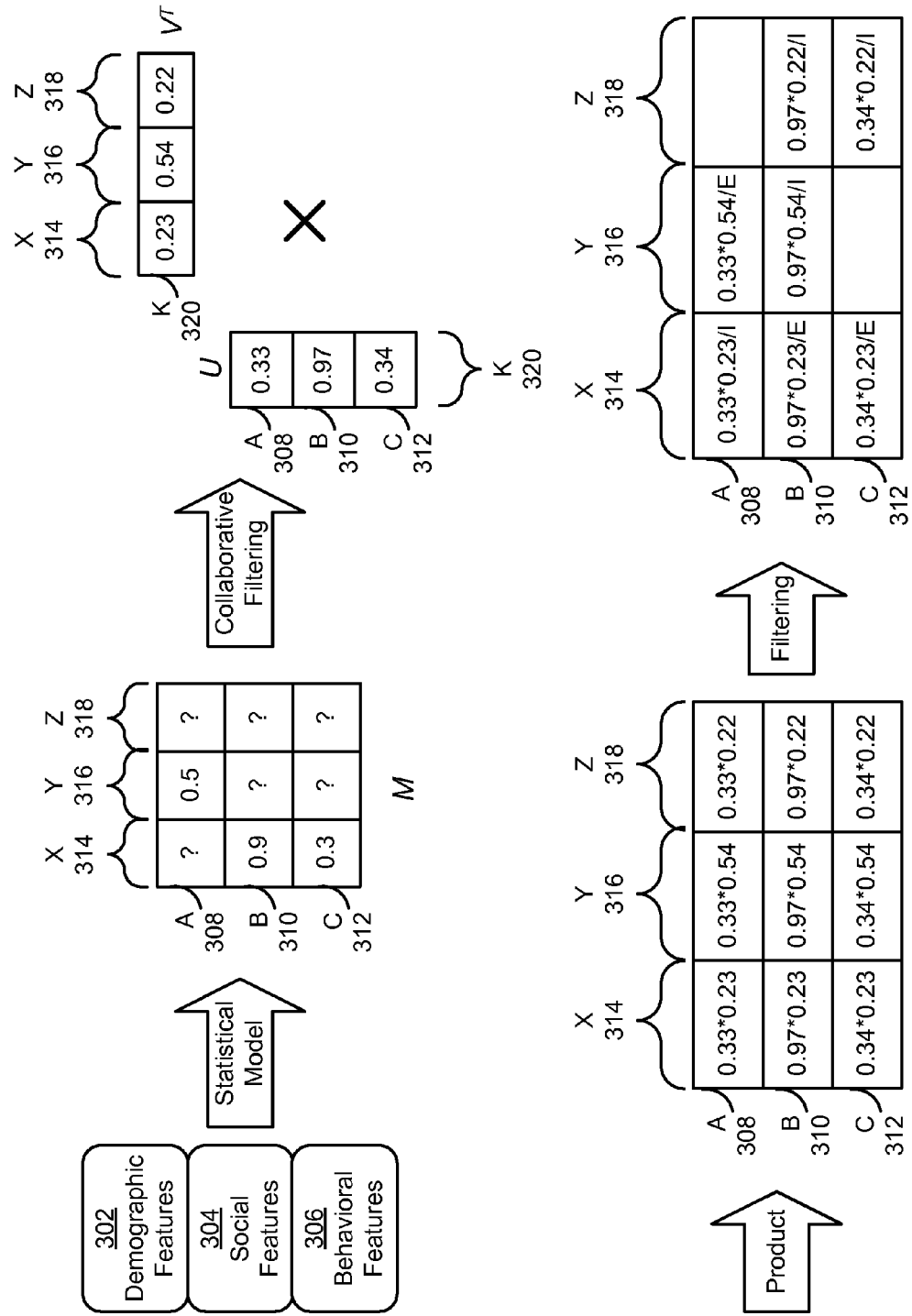
FIG. 3A shows the exemplary generation of a set of reputation scores in a reputation system in accordance with the disclosed embodiments.

FIG. 3A shows the exemplary generation of a set of reputation scores in a reputation system (e.g., reputation system 102 of FIG. 1) in accordance with the disclosed embodiments. More specifically, FIG. 3A shows the generation of reputation scores for items representing users in the reputation system and dimensions representing skills of the users. First, features associated with the users may be obtained. The features may include demographic features 302, social features 304, and behavioral features 306. Demographic features 302 may include data related to a user's location, age, experience, education, and/or background; social features 304 may include features related to the behavior of other users with respect to the user; and behavioral features 306 may include features related to the user's interaction with an online professional network and/or related websites or applications.

Next, a statistical model (e.g., statistical model 216 of FIG. 2) is applied to the features to generate a set of reputation scores, which are included in a matrix M 350 of users A 308, B 310, and C 312 by skills X 314, Y 316, and Z 318. User A 308 has a reputation score of 0.5 in skill Y 316, user B 310 has a reputation score of 0.9 in skill X 314, and user C 312 has a reputation score of 0.3 in skill X 314. All other elements in the matrix may be set to unknown values (e.g. "?") because the statistical model is not used to calculate the corresponding reputation scores. For example, the statistical model may only be used to calculate reputation scores for skills that are explicitly listed or found in the users' profiles with the online professional network.

To infer the unknown values, a collaborative filtering technique may be used to calculate a factorization of M 350, resulting in two factor matrices U and $V^T$. Prior to factorizing M 350, a normal score transformation may be applied to the reputation scores in M 350 to produce normally distributed values for the reputation scores for subsequent use by the collaborative filtering technique.

U may be a matrix of users A 308, B 310, and C 312 by a lower dimension K 320, and $V^T$ may be a matrix of K 320 by skills X 314, Y 316, and Z 318. K 320 may represent a lower-dimension vector of "clusters" of related skills. For example, K 320 may be a vector with hundreds of elements in a factorization of M 350 containing millions of users and tens of thousands of skills. In addition, elements in U may be user (e.g., item) factors, and elements in $V^T$ may be skill (e.g., dimension) factors. Factors in U and $V^T$ may be calculated by minimizing a weighted least squares loss function using gradient descent and/or another optimization technique. Consequently, the factor matrices may include factors that, when multiplied, approximate the original matrix M 350. Furthermore, the use of unknown values instead of reputation scores of 0 in M 350 may prevent errors associated with setting unknown elements in M 350 to 0 from affecting the subsequent factorization of the matrix.

After the factorization is calculated, a product of the factor matrices may be used to update the original matrix M with inferred values instead of unknown values. For example, the user factors in U (e.g., 0.33, 0.97, 0.34) may be multiplied with the skill factors in $V^T$ (e.g., 0.23, 0.54, 0.22) to produce the updated matrix M' 352.

The updated matrix M' 352 may then be filtered to produce a filtered matrix M' 354 to remove low-confidence reputation scores. For example, confidence scores for the reputation scores may be calculated by the statistical model, and the reputation scores may be filtered so that only reputation scores associated with confidence scores above a pre-specified threshold are included in the filtered matrix M' 354. As shown in FIG. 3A, reputation scores for user A 308 and skill Z 318 and user C 312 and skill Y 316 may be removed from the matrix because confidence scores for the reputation scores are not high enough.

Finally, elements in the filtered matrix M' 354 may be labeled with metadata identifying the elements as explicit (e.g., "E") or inferred (e.g., "I"). For example, reputation scores found in the original matrix M 350 may be labeled as explicit, while unknown values in M 350 may be labeled as inferred. The filtered, labeled elements may then be included in an inverted index, and the inverted index may be used to generate a ranking of the users by the reputation scores in response to a query, as discussed in further detail below with respect to FIG. 3B.

Figure 3B:
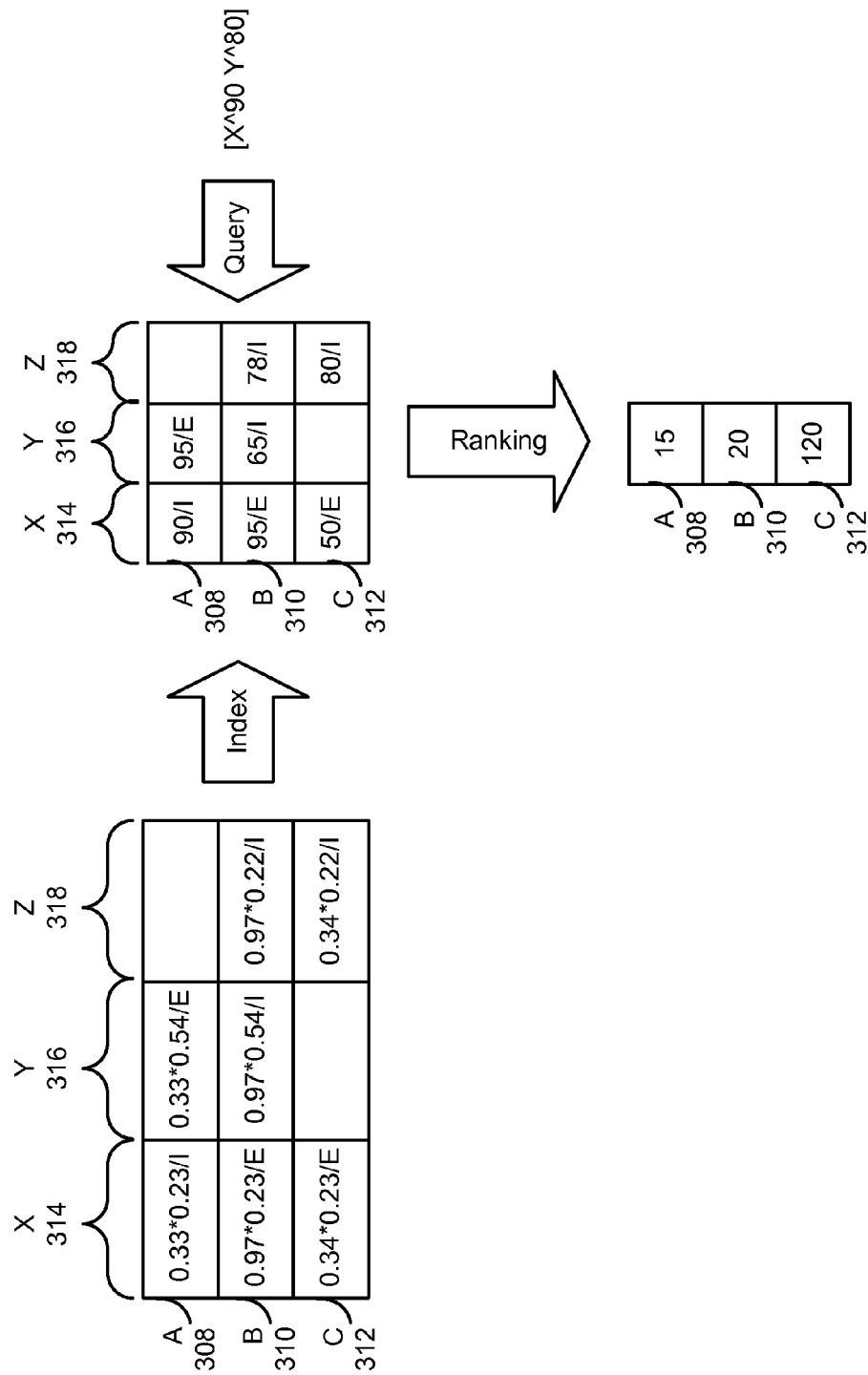
FIG. 3B shows the exemplary querying of a reputation system in accordance with the disclosed embodiments.

FIG. 3B shows the exemplary querying of a reputation system (e.g., reputation system 102 of FIG. 1) in accordance with the disclosed embodiments. In particular, FIG. 3B shows the querying of reputation scores for users A 308, B 310, and C 312 and skills X 314, Y 316, and Z. As described above, the reputation scores may be filtered and labeled as explicit or inferred.

To facilitate querying and/or ranking of the reputation scores, the reputation scores may be stored in an index I 360, such as an inverted index. Moreover, I 360 may contain percentiles of the reputation scores, in lieu of or in addition to the reputation scores. The percentiles may be calculated based on the distribution of users' reputation scores for a given dimension and/or skill. As shown in FIG. 3B, reputation scores for user A 308 and dimensions X 314 and Y 316 may be replaced with percentiles of 90 and 95, respectively. Reputation scores for user B 310 and dimensions X 314, Y 316, and Z 318 may be replaced with percentiles of 95, 65, and 78, respectively. Reputation scores for user C 312 and dimensions X 314 and Z 318 may be replaced with percentiles of 50 and 80, respectively.

The percentiles may expedite processing of a query (e.g., "[X^90Y^80]") for reputation scores in skills X 314 and Y 316 and percentiles of 90 and 80, respectively. More specifically, the ranking may be generated according to a closeness of each user's reputation scores to the corresponding percentiles in the query. For example, a rectilinear distance between the reputation scores and the percentiles may be calculated, and the users may be ranked in ascending order of distance. User A 308 may have a distance of 15 from the query (e.g., 90-90+ 95-80), user B 310 may have a distance of 20 from the query (e.g., 95-90+80-65), and user C 312 may have a distance of 120 from the query (e.g., 90-50+80-0). As a result, user A 308 may be first in the ranking, user B 310 may be second in the ranking, and user C 312 may be third in the ranking.

The ranking may then be provided in a response to the query. For example, the ranking may be used to order search results that are displayed to a user (e.g., recruiter, potential employer, etc.) from which the query was received. The ranking may also be used to recommend one or more users (e.g. near the top of the ranking) as suitable or ideal candidates for a position and/or job opening to be filled by the querying user.

Figure 4:
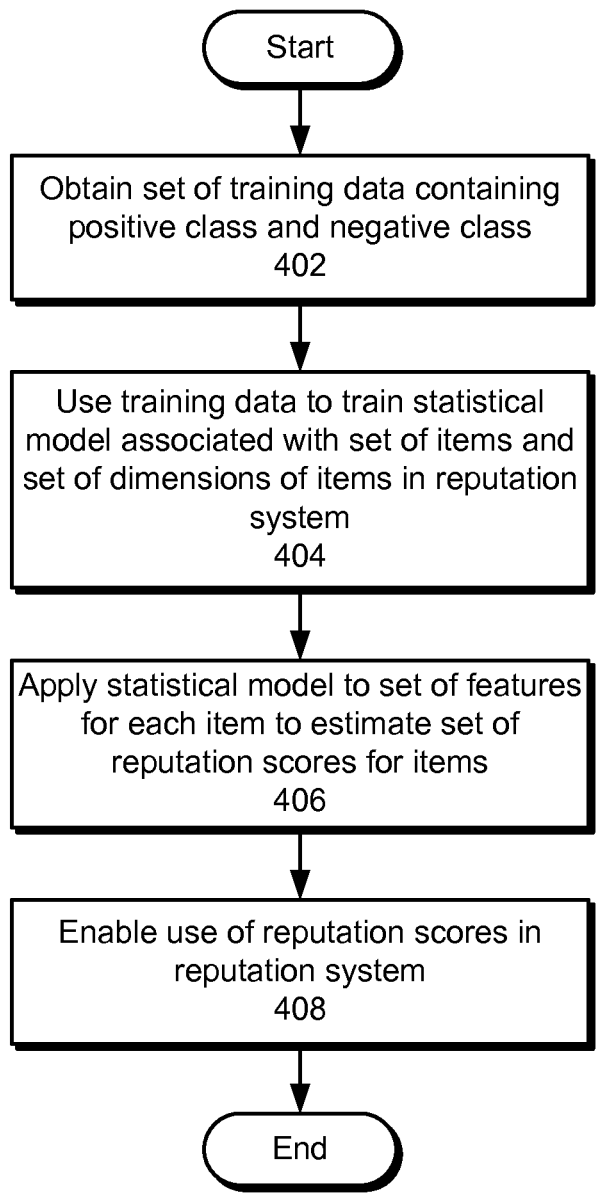
FIG. 4 shows a flowchart illustrating the process of facilitating use of a reputation system in accordance with the disclosed embodiments.

FIG. 4 shows a flowchart illustrating the process of facilitating use of a reputation system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a set of training data containing a positive class and a negative class is obtained (operation 402). The positive class may include data associated with items of a particular class or category, while negative class 220 may include data associated with items that do not belong in the class or category. For example, the positive class may include features of users who are experts in a skill or field, and the negative class may include features of random users who list the skill or field in the users' profiles with an online professional network.

Next, the training data is used to train a statistical model associated with a set of items and a set of dimensions of the items in the reputation system (operation 404). For example, the training data may be used by an MLE and/or another estimation technique to estimate the parameters of a logistic regression model. After the statistical model is trained, the statistical model is applied to a set of features for each item to estimate the set of reputation scores for the items (operation 406). Continuing with the above example, the logistic regression model may be applied to demographic, social, and/or behavioral features associated with a set of users to calculate reputation scores representing the users' levels of expertise in explicitly stated skills from the users' profiles with an online professional network. The social features may include endorsement features related to endorsements of skills in the online professional network, such as a number of endorsers, a number of endorsements, and/or a ranking in an endorsement network.

Finally, use of the reputation scores in the reputation system is enabled (operation 408). As described in further detail below with respect to FIGS. 5-6, a matrix of the items and dimensions may be populated with the reputation scores, a factorization of the matrix may be calculated, and the factorization may used to obtain a ranking of the items by one or more of the dimensions.

Figure 5:
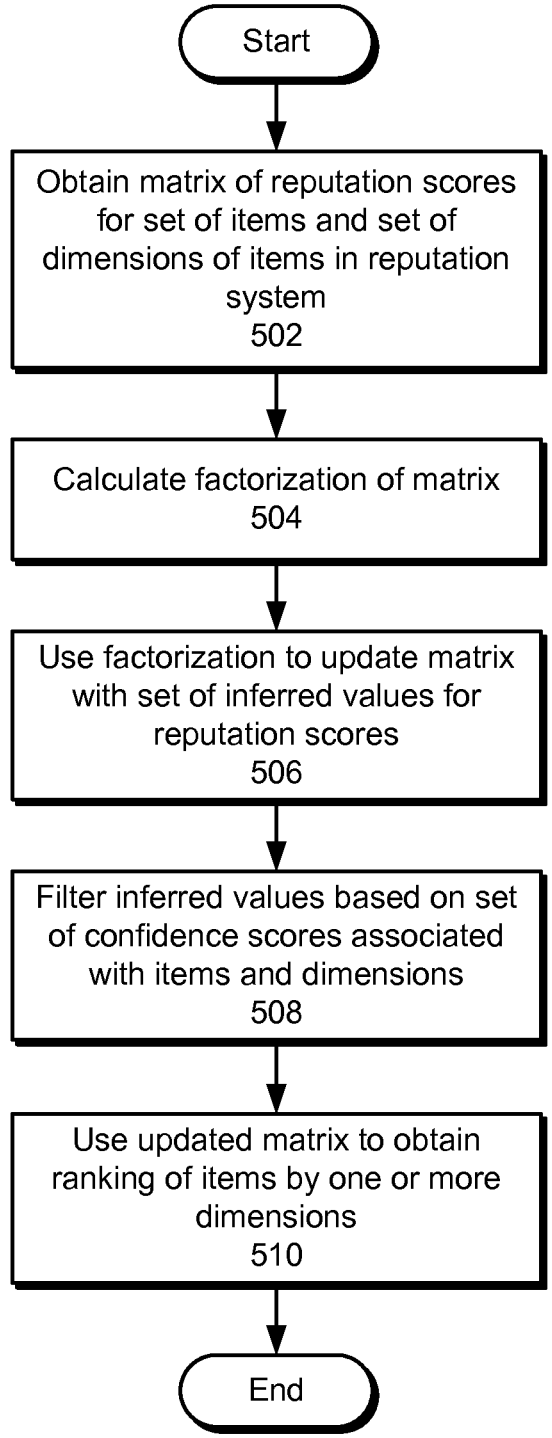
FIG. 5 shows a flowchart illustrating the process of providing a reputation system in accordance with the disclosed embodiments.

FIG. 5 shows a flowchart illustrating the process of providing a reputation system in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a matrix of reputation scores for a set of items and a set of dimensions of the items in the reputation system is obtained (operation 502). The matrix may include unknown values for a subset of the reputation scores. Next, a factorization of the matrix is calculated (operation 504). The factorization may be calculated using a collaborative filtering technique, which produces two or more factor matrices that approximate the reputation scores in the matrix when the factor matrices are multiplied together. For example, a matrix of users by skills may be decomposed into a first matrix of users by one or more lower dimensions and a second matrix of the lower dimension(s) by skills. The lower dimensions (e.g., a reduced dimensionality space of the factorization) may represent one or more clusters of skills, such as skills that may be common to the same field, occupation, and/or industry.

The factorization may then be used to update the matrix with a set of inferred scores for the reputation scores (operation 506). For example, the factor matrices may be multiplied to generate inferred reputation scores that replace the unknown values in the matrix. The inferred values may also be filtered based on a set of confidence scores associated with the items and dimensions (operation 508). For example, the confidence scores may be generated by a statistical model used to calculate the reputation scores in the original matrix. Inferred values with confidence scores above a pre-specified threshold may be kept in the updated matrix, while inferred values with confidence scores below the threshold may be removed from the matrix.

Finally, the updated matrix is used to obtain a ranking of the items by one or more of the dimensions (operation 510). As discussed in further detail below with respect to FIG. 6, the ranking may be generated by obtaining an inverted index of the dimension(s), using the inverted index to identify a subset of the items with reputation scores in the dimension(s), and ranking the subset of the items by the reputation scores. The ranking may be based on a linear combination (e.g., sum, weighted sum, etc.) of the reputation scores. For example, the items may be ranked according to a weighted sum of reputation scores to allow for differences in the relative importance of each dimension in the ranking. In the weighted sum, reputation scores for a first dimension that is twice as important as a second dimension may be multiplied by a weight that is twice as large as the weight by which reputation scores in the second dimension are multiplied.

Figure 6:
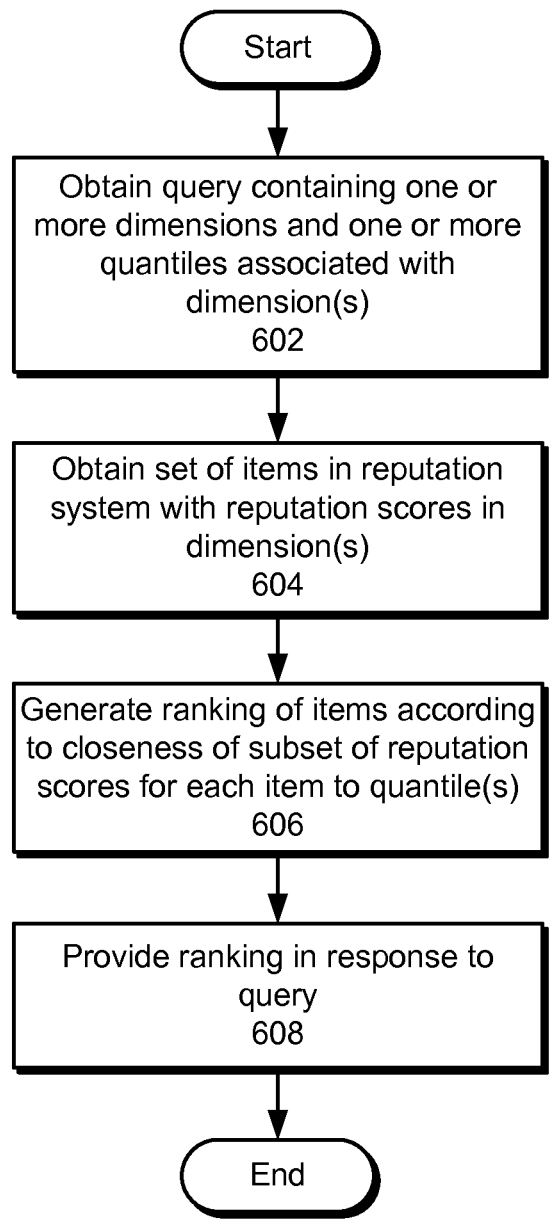
FIG. 6 shows a flowchart illustrating the process of querying a reputation system in accordance with the disclosed embodiments.

FIG. 6 shows a flowchart illustrating the process of querying a reputation system in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a query containing one or more dimensions and one or more quantiles associated with the dimension(s) is obtained (operation 602). For example, the query may include multiple skills of users in the reputation system, as well as percentiles associated with each skill. If a quantile is not specified for a dimension in the query, a default quantile (e.g., $100^{th}$ percentile) may be used. Alternatively, a quantile associated with the dimension may be identified based on a querying pattern associated with the dimension and/or query. For example, a quantile for the dimension may be set according to the distribution or frequency of quantiles for the dimension from similar queries.

Next, a ranking of a set of items in the reputation system is generated based on reputation scores for the items in the dimension(s) and the quantile(s). To generate the ranking, a set of items in the reputation system with reputation scores in the dimension(s) is obtained (operation 604). The items may be identified using an inverted index of the dimension(s). For example, the inverted index may include reputation scores of the items in the dimension(s), as well as labels of "explicit" or "inferred" for the reputation scores. An item may be included in the set if the item has an explicit reputation score in at least one dimension associated with a disjunctive (e.g., "OR") query. On the other hand, the item may be included in the set if the item has explicit reputation scores in all dimensions associated with a conjunctive (e.g., "AND") query.

A ranking of the items is then generated according to a closeness of a subset of the reputation scores for each item to the quantile(s) (operation 606). For example, a rectilinear distance between the reputation scores for each item and the corresponding quantiles in the query may be computed, and the ranking may be generated by ordering the items by increasing rectilinear distance. To expedite calculation of the rectilinear distance, the inverted index may contain pre-computed quantiles associated with the reputation scores.

Finally, the ranking is provided in response to the query (operation 608). For example, the ranking may be used to order a set of search results for the query to facilitate use of the search results by a user from which the query was received. The ranking may also be used to recommend one or more items (e.g. near the top of the ranking) to the user.

Figure 7:
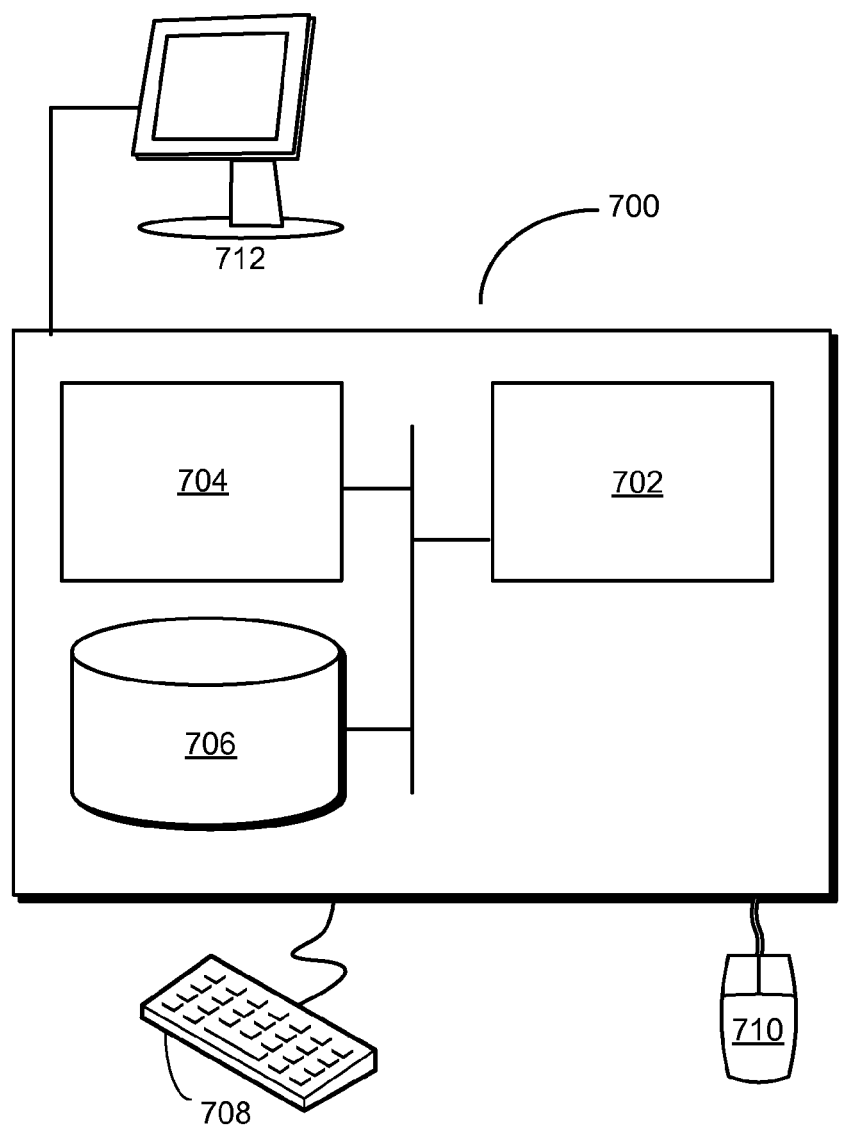
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a reputation system. The reputation system may include a statistical model associated with a set of items and a set of dimensions of the items in the reputation system, which is trained using a positive class and a negative class by a training apparatus. The reputation system may also include a scoring apparatus that applies the statistical model to a set of features for each of the items to estimate a set of reputation scores for the items. The scoring apparatus may then include the reputation scores in a matrix of the items and dimensions.

The reputation system may further include an inference apparatus that calculates a factorization of the matrix and uses the factorization to update the matrix with inferred values for the reputation scores, as well as a ranking apparatus that uses the updated matrix to obtain a ranking of the items by one or more of the dimensions. Finally, the reputation system may include a query-processing apparatus that obtains a query containing one or more dimensions and one or more quantiles associated with the dimension(s) and provides the ranking in a response to the query.

In addition, one or more components of computer system 700 may be remotely located and connected to the other components over a network. Portions of the present embodiments (e.g., training apparatus, scoring apparatus, inference apparatus, ranking apparatus, query-processing apparatus, etc.) may also be located on different nodes of a distributed system that implements the embodiments. For example, the present embodiments may be implemented using a cloud computing system that calculates and/or infers reputation scores for a set of items and a set of dimensions of the items and provides rankings of the reputation scores in response to queries from a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating use of a reputation system, comprising:
    obtaining a statistical model associated with a set of users and a set of skills of the users in the reputation system, wherein the statistical model is trained using a positive class and a negative class;
    applying the statistical model to a set of features for each of the users to estimate a set of reputation scores for the users;
    populating a matrix of the users and the skills with the reputation scores and unknown values for user-skill pairs that do not have explicit reputation scores;
    calculating a factorization of the matrix to produce at least two factor matrices, wherein the at least two factor matrices are multiplied to generate one or more inferred values that replace the unknown values in the matrix; and
    obtaining a ranking of the users by one or more skills specified by a query, wherein the ranking is based on a linear combination of reputation scores associated with the one or more skills;

wherein obtaining the ranking of the users includes:
obtaining an inverted index of the one or more skills,
using the inverted index to identify a subset of the users with reputation scores in the one or more skills, and
ranking the subset of the users by the reputation scores.

2. The computer-implemented method of claim 1, further comprising:
obtaining a set of training data comprising the positive class and the negative class; and
using the training data to train the statistical model.

3. The computer-implemented method of claim 1, wherein the set of features comprises demographic features, social features, and behavioral features.

4. The computer-implemented method of claim 3, wherein the social features comprise one or more endorsement features.

5. The computer-implemented method of claim 4, wherein the one or more endorsement features comprise:
a number of endorsers;
a number of endorsements; and
a ranking in an endorsement network.

6. The computer-implemented method of claim 1, wherein the positive class comprises known experts and the negative class comprises random users.

7. The computer-implemented method of claim 1, wherein the statistical model comprises a logistic regression model.

8. The computer-implemented method of claim 1, further comprising:
generating quantiles of the reputation scores in the matrix of the users and skills; and
generating a ranking of the users based on closeness of the generated quantiles of the reputation scores to a plurality of quantiles specified in a query.

9. A reputation system, comprising:
a statistical model associated with a set of users and a set of skills of the users in the reputation system, wherein the statistical model is trained using a positive class and a negative class;
a scoring apparatus, operated by a computer system comprising at least a processor, configured to apply the statistical model to a set of features for each of the users to estimate a set of reputation scores for the users, wherein the set of reputation scores and unknown values for user-skill pairs that do not have explicit reputation scores are used to populate a matrix of the users and the skills;
an inference apparatus configured to:
calculate a factorization of the matrix to produce at least two factor matrices, wherein the at least two matrices are multiplied to generated one or more inferred values that replace the unknown values in the matrix; and
a ranking apparatus configured to enable use of the set of reputation scores in the reputation system, wherein a ranking of the users is obtained by a one or more skills specified by a query using the factorization of the matrix, wherein the ranking is based on a linear combination of reputation scores associated with the one or more skills;
wherein obtaining the ranking of the users includes:
obtaining an inverted index of the one or more skills,
using the inverted index to identify a subset of the users with reputation scores in the one or more skills, and
ranking the subset of the users by the reputation scores.

10. The reputation system of claim 9, further comprising:
a training apparatus configured to:
obtain a set of training data comprising the positive class and the negative class; and
use the training data to train the statistical model.

11. The reputation system of claim 9, wherein the set of features comprises demographic features, social features, and behavioral features.

12. The reputation system of claim 11, wherein the social features comprise one or more endorsement features.

13. The reputation system of claim 9, wherein the positive class comprises known experts and the negative class comprises random users.

14. The reputation system of claim 9, wherein the statistical model comprises a logistic regression model.

15. A non-transitory computer-readable storage medium storing instructions that when executed by a computer cause the computer to perform a method for facilitating use of a reputation system, the method comprising:
obtaining a statistical model associated with a set of users and a set of skills of the users in the reputation system, wherein the statistical model is trained using a positive class and a negative class;
applying the statistical model to a set of features for each of the users to estimate a set of reputation scores for the users;
populating a matrix of the users and the skills with the reputation scores and unknown values for user-skill pairs that do not have explicit reputation scores;
calculating a factorization of the matrix to produce at least two factor matrices, wherein the at least two factor matrices are multiplied to generate one or more inferred values that replace the unknown values in the matrix; and
obtaining a ranking of the users by one or more skills specified by a query, wherein the ranking is based on a linear combination of reputation scores associated with the one or more skills;
wherein obtaining the ranking of the users includes:
obtaining an inverted index of the one or more skills,
using the inverted index to identify a subset of the users with reputation scores in the one or more skills, and
ranking the subset of the users by the reputation scores.

16. The non-transitory computer-readable storage medium of claim 15, the method further comprising:
obtaining a set of training data comprising the positive class and the negative class; and
using the training data to train the statistical model.

17. The non-transitory computer-readable storage medium of claim 15, wherein the positive class comprises known experts and the negative class comprises random users.

18. The non-transitory computer-readable storage medium of claim 15, wherein the set of features comprises demographic features, social features, and behavioral features.

19. The non-transitory computer-readable storage medium of claim 18, wherein the social features comprise one or more endorsement features.

20. The non-transitory computer-readable storage medium of claim 15, wherein the statistical model comprises a logistic regression model.

* * * * *